US009838590B2

(12) United States Patent
Zhang et al.

(10) Patent No.: US 9,838,590 B2
(45) Date of Patent: Dec. 5, 2017

(54) PHASE-DETECTION AUTO-FOCUS PIXEL ARRAY AND ASSOCIATED IMAGING SYSTEM

(71) Applicant: OmniVision Technologies, Inc., Santa Clara, CA (US)

(72) Inventors: Boyang Zhang, San Jose, CA (US); Chin Poh Pang, Pleasanton, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 82 days.

(21) Appl. No.: 15/071,916

(22) Filed: Mar. 16, 2016

(65) Prior Publication Data
US 2017/0272642 A1    Sep. 21, 2017

(51) Int. Cl.
*H04N 5/225*    (2006.01)
*H04N 5/232*    (2006.01)

(52) U.S. Cl.
CPC ....... *H04N 5/23212* (2013.01); *H04N 5/2257* (2013.01)

(58) Field of Classification Search
None
See application file for complete search history.

(56) References Cited

U.S. PATENT DOCUMENTS

| 2012/0224096 A1 | 9/2012 | Shimoda et al. |
| 2013/0016274 A1 | 1/2013 | Matsuo et al. |
| 2013/0258098 A1 | 10/2013 | Ikemoto |
| 2014/0211076 A1 | 7/2014 | Inoue et al. |
| 2015/0062390 A1 | 3/2015 | Kim et al. |
| 2015/0381951 A1 | 12/2015 | Mlinar et al. |

*Primary Examiner* — Stephen Coleman
(74) *Attorney, Agent, or Firm* — Lathrop Gage LLP

(57) ABSTRACT

A phase-detection auto-focus (PDAF) pixel array includes a first pixel and a second pixel. The first pixel, located at a first distance from a center of the PDAF pixel array, includes a first inner photodiode and a first outer photodiode with respect to the center. The first inner photodiode and the first outer photodiode occupy respectively a first inner area and a first outer area. The first inner area divided by the first outer area equals a first ratio. The second pixel, located at a second distance from the center that exceeds the first distance, includes a second inner photodiode and a second outer photodiode with respect to the center. The second inner photodiode and the second outer photodiode occupy respectively a second inner area and a second outer area. The second inner area divided by the second outer area equals a second ratio, which exceeds the first ratio.

16 Claims, 15 Drawing Sheets

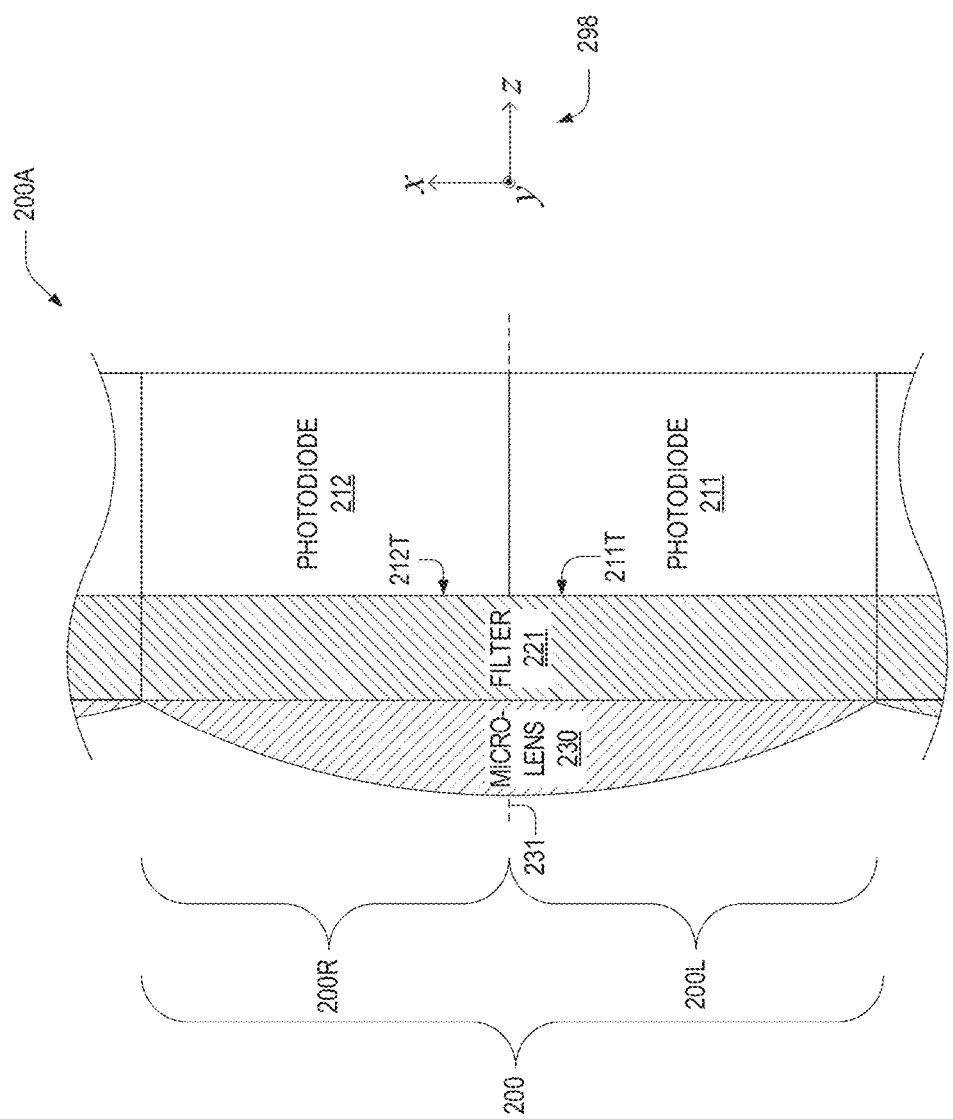

PHASE-DETECTION AUTO-FOCUS PIXEL ARRAY AND ASSOCIATED IMAGING SYSTEM

BACKGROUND

Many digital cameras have autofocus capability. Autofocus may be fully automatic such that the camera identifies objects in the scene and focuses on the objects. In some cases, the camera may even decide which objects are more important than other objects and subsequently focus on the more important objects. Alternatively, autofocus may utilize user input specifying which portion or portions of the scene are of interest. Based thereupon, the autofocus function identifies objects within the portion(s) of the scene, specified by the user, and focuses the camera on such objects.

To achieve market adoption, the autofocus function must be reliable and fast such that every time a user captures an image, the camera quickly brings the desired portion, or portions, of the scene into focus. Preferably, the autofocus function is sufficiently fast that the user does not notice any delay between pressing the trigger button and image capture. The autofocus is particularly important for cameras having no means for manual focus, such as compact digital cameras and camera phones.

Many digital cameras use contrast autofocus, wherein the autofocus function adjusts the imaging objective to maximize contrast in at least a portion of the scene, thus bringing that portion of the scene into focus. More recently, phase-detection autofocus has gained popularity because it is faster than contrast autofocus. Phase-detection autofocus directly measures the degree of misfocus by comparing light passing through one portion of the imaging objective, e.g., the left portion, with light passing through another portion of the imaging objective, e.g., the right portion. Some digital single-lens reflex cameras include a dedicated phase-detection sensor in addition to the image sensor that captures images.

However, this solution is not feasible for more compact and/or less expensive cameras. Therefore, camera manufacturers are developing image sensors with on-chip phase detection, i.e., image sensors with integrated phase detection capability via the inclusion of phase-detection auto-focus (PDAF) pixels in the image sensor's pixel array.

FIG. 1 illustrates one exemplary image sensor 101 with PDAF pixels in an exemplary use scenario 190. Image sensor 101 is implemented in a digital camera 180 for imaging a scene 150. Digital camera 180 is, for example, a camera phone or a compact digital camera. Digital camera 180 utilizes the on-chip phase detection capability of image sensor 101 to focus on scene 150. When focused, digital camera 180 utilizes image sensor 101 to capture a focused image 120, instead of a defocused image 130, of scene 150.

Image sensor 101 has a pixel array 200A that includes at least one dual-diode PDAF pixel 200. FIG. 2 is a cross-sectional view of the dual-diode PDAF pixel 200 of pixel array 200A. Dual-diode PDAF pixel 200 includes photodiodes 211 and 212 having a common color filter 221 and microlens 230. Microlens 230 has an optical axis 231 centered between photodiodes 211 and 212. Photodiodes 211 and 212 have respective top surfaces 211T and 212T. Dual-diode PDAF pixel 200 may be viewed as including phase-detection pixels 200L and 200R, which include photodiode 211 and photodiode 212 respectively.

FIGS. 3A-3C are cross-sectional views of a PDAF imaging system 300 in which a lens 310 forms an image 352 of an off-axis object 350 at an image plane 312 proximate pixel array 200A. Lens 310 has an optical axis 310A that intersects pixel array 200A at a pixel-array center 200AC. Image 352 is at a radial distance 352R from optical axis 310A and pixel-array center 200AC. Image plane 312 and lens 310 are separated by an image distance 312Z.

FIGS. 3A-3C illustrate propagation of a chief ray 351(0), an upper marginal ray 351(1), and a lower marginal ray 351(−1). In the cross-sectional view of FIGS. 3A-3C, pixel array 200A includes a column of dual-diode PDAF pixels 200 of FIG. 2. In FIG. 3A, pixel array 200A is in front of image plane 312. In FIG. 3B, pixel array 200A is coplanar with image plane 312. In FIG. 3C, pixel array 200A is behind image plane 312.

FIGS. 3A-3C also include schematic pixel column responses 303 and 304, which represent response of, within a column of phase-detection pixels PDAF pixel 200, (a) left photodiodes 211 and (b) right photodiodes 212, respectively.

In FIG. 3A, pixel array 200A is behind image plane 312 such that image 352 is out of focus at pixel array 200A. Pixel array 200A is at a distance 311A from lens 310, which corresponds to a misfocus distance $\Delta z = \Delta z_A > 0$ from image plane 312. Pixel column response 303A illustrates that a column of left phase-detection pixels detects one intensity peak 303A' corresponding to upper marginal ray 351(1). Pixel column response 304A illustrates that a column of right phase-detection pixels detects one intensity peak 304A' corresponding to lower marginal ray 351(−1). Intensity peak 304A' is closer to optical axis 310A than intensity peak 303A'. On pixel array 200A, intensity peaks 303A' and 304A' are separated by a distance $\Delta x = \Delta x_A > 0$.

In FIG. 3B, pixel array 200A is located at image plane 312 such that image 352 is in focus. Pixel array 200A is at a distance 311B from lens 310, which corresponds to a misfocus distance $\Delta z = \Delta z_B = 0$ from image plane 312. Pixel column response 303B illustrates that a column of left phase-detection pixels detects one intensity peak 303B' corresponding rays 351(−1,0,1) being incident on the same left-phase-detection pixel in the column. Pixel column response 304B illustrates that a column of right phase-detection pixels detects one intensity peak corresponding to rays 351(−1,0,1) being incident on the same right-phase-detection pixel in the column. On pixel array 200A, intensity peaks 303B and 304B' are separated by a distance $\Delta X = \Delta X_B$, which is illustrated as equal to zero in FIG. 3B In FIG. 3C, pixel array 200A is in front of image plane 312 such that image 352 is out of focus at pixel array 200A. Pixel array 200A is at a distance 311C from lens 310, which corresponds to a misfocus distance $\Delta z = \Delta z_C < 0$ from image plane 312. Pixel column response 303C illustrates that a column of left phase-detection pixels detects one intensity peak corresponding to upper marginal ray 351(1). Pixel column response 304C illustrates that a column of right phase-detection pixels detects one intensity peak corresponding to lower marginal ray 351(−1). Intensity peak 304C' is further from optical axis 310A than is intensity peak 303C'. On pixel array 200A, intensity peaks 303C' and 304C' are separated by a distance $\Delta x = \Delta x_C < 0$.

One indicator of the accuracy of phase-detection autofocusing by image sensor 101, hereinafter "PDAF accuracy," is how well the magnitude of $\Delta x$ indicates the magnitude of misfocus $\Delta z$. Specifically, with reference to FIG. 3B, zero misfocus ($\Delta z = 0$) should correspond to $\Delta x = 0$. Hence, the smaller the magnitude of $\Delta x$ is when $\Delta z = 0$, the higher the PDAF accuracy.

SUMMARY OF THE INVENTION

In a first embodiment, a PDAF pixel array is disclosed. The PDAF pixel array includes a first pixel and a second pixel. The first pixel is located at a first distance from a center of the PDAF pixel array and includes a first inner photodiode and a first outer photodiode with respect to the center. The first inner photodiode and the first outer photodiode occupy respectively a first inner area and a first outer area. The first inner area divided by the first outer area equals a first ratio. The second pixel is located at a second distance from the center and includes a second inner photodiode and a second outer photodiode with respect to the center. The second inner photodiode and the second outer photodiode occupy respectively a second inner area and a second outer area. The second inner area divided by the second outer area equals a second ratio. The second distance exceeds the first distance and the second ratio exceeds the first ratio.

In a second embodiment, a PDAF imaging system is disclosed. The PDAF imaging system includes an imaging lens, and an image sensor, aligned with the imaging lens, having the PDAF pixel array.

BRIEF DESCRIPTION OF THE FIGURES

FIG. 2 is a cross-sectional view of a prior-art dual-diode PDAF pixel of the pixel array of FIG. 1.

DETAILED DESCRIPTION OF THE EMBODIMENTS

Figure 4:
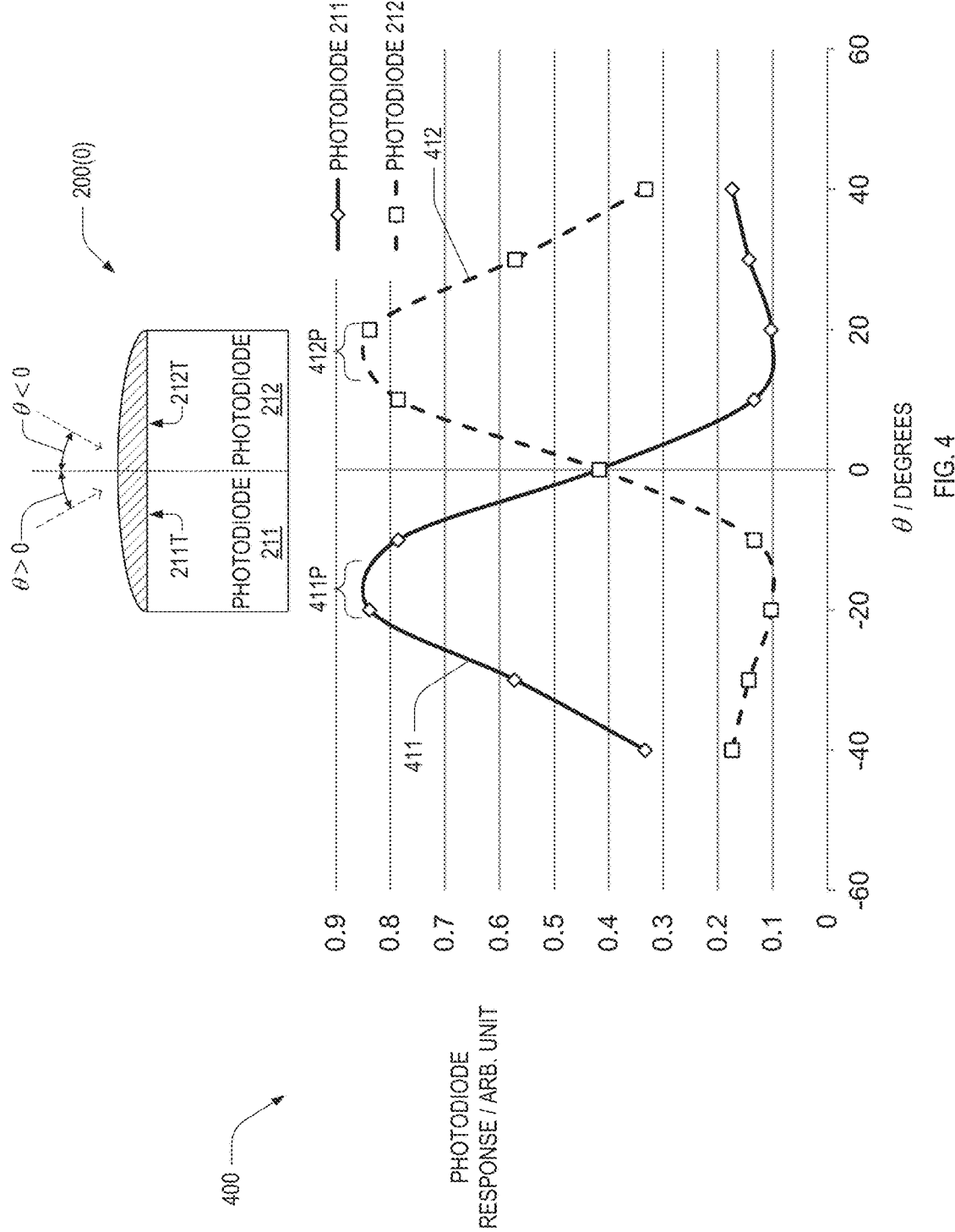
FIG. 4 is a schematic angular selectivity plot of the on-axis dual-diode PDAF pixel of FIG. 2.

Applicant has determined that PDAF accuracy depends on angular sensitivity of dual-diode PDAF pixels 200. FIG. 4 is a schematic angular selectivity plot 400 of an on-axis dual-diode PDAF pixel 200(0), where on-axis refers to where optical axis 310A of lens 310 intersects pixel array 200A. Plot 400 includes photodiode response 411 of left photodiode 211 and photodiode response 412 of right photodiode 212 as a function of incident light angle θ. Since dual-diode PDAF pixel 200(0) is aligned with optical axis 310A of lens 310, a chief ray incident thereon is normal to photodiode top surfaces 212T and 211T. Photodiode 212 has a peak response for positive incident light angles θ>0. Photodiode 211 has a peak response for negative incident light angles θ<0. Photodiode responses 411 and 412 are equal at relative angle $θ_r = θ_x = 0°$ and have respective peak regions 411P and 412P that are symmetric about $θ_x$. Herein, relative angle $θ_x$ denotes the minimum absolute value of $θ_r$, at which photodiode responses of a multi-diode PDAF pixel are equal. Applicant has determined that PDAF accuracy depends on angular sensitivity of dual-diode PDAF pixels, such as dual-diode PDAF pixels 200.

Figure 5:
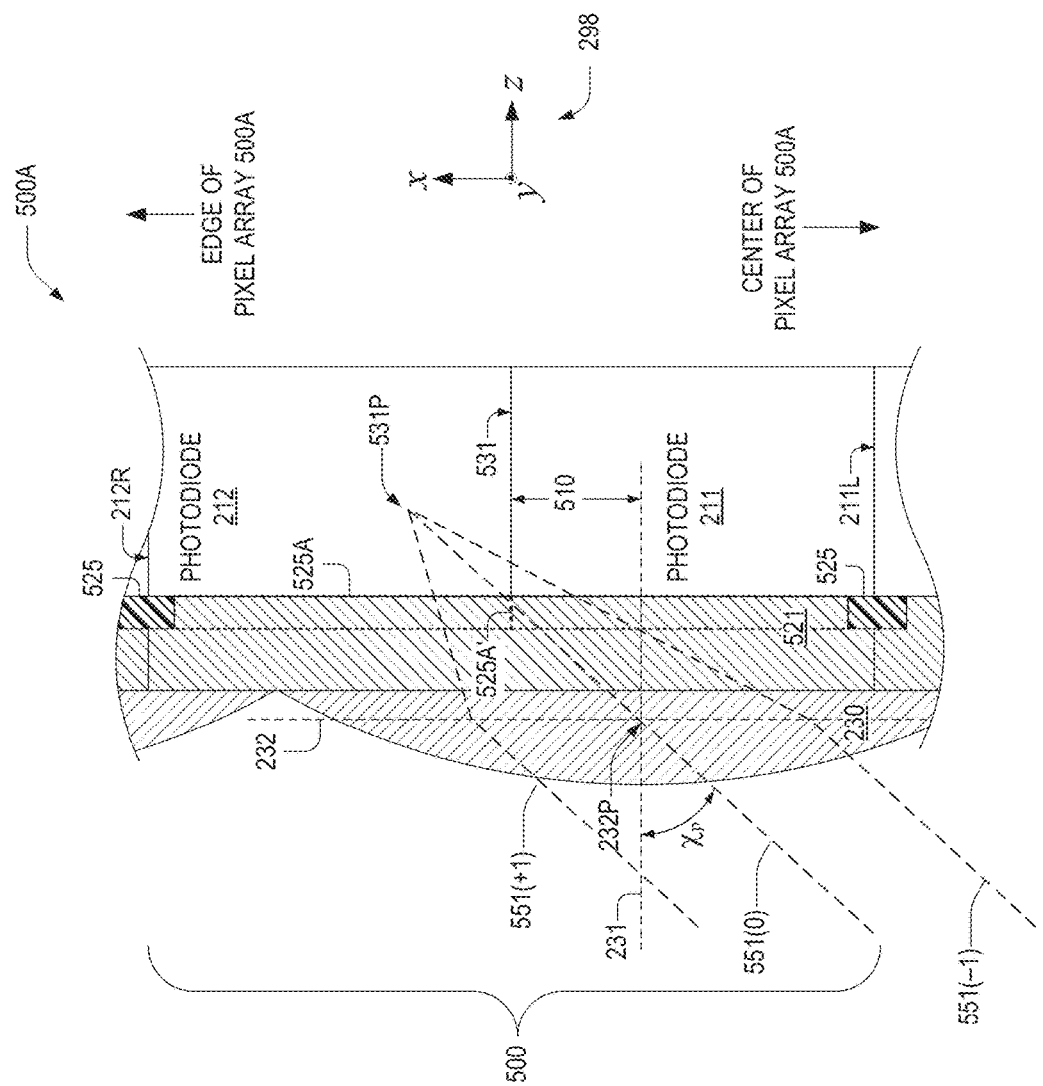
FIG. 5 is a cross-sectional view of an off-axis multi-diode PDAF pixel of a PDAF pixel array, in an embodiment.

FIG. 5 is a cross-sectional view of an off-axis multi-diode PDAF pixel 500 of a PDAF pixel array 500A. PDAF pixel array 500A is for example part of a CMOS image sensor. PDAF pixel 500 is similar to dual-diode PDAF pixel 200 except that microlens 230 is not aligned with photodiodes 211 and 212. Optical axis 231 is offset by a distance 510 from an interface 531 between photodiode 211 and 212. Microlens 230 has a principal plane 232 that intersects optical axis 231 at a focus 232P. A color filter 521 is between microlens 231 and photodiodes 211, 212.

PDAF pixel 500 is at a distance $r_p$ from the center of PDAF pixel array 500A, where $r_p$ is measured from the pixel array center to a location related to PDAF pixel 500, such as optical axis 231 or interface 531. Distance $r_p$ is similar to distance 352R, FIG. 3. In an exemplary use scenario, PDAF pixel array 500A is at the image plane of lens 310 having an effective focal length f. Lens 310 transmits light at a plurality of chief-ray angles (CRAs) χ with respect to optical axis 310A, such that a "design" CRA $χ_p$ of a chief ray incident on PDAF pixel 500 depends on distance $r_p$. Design CRA $χ_p$ may be related to distance $r_p$ according to tan $$χ_p = \tan\frac{r_p}{d_{pa}},$$

hereinafter referred to as Equation (1). For example, Eq. (1) applies at least for a singlet lens.

Design CRA $χ_p$ may be defined without reference to an imaging lens. For example, PDAF pixel 500 may include an opaque structure 525 that has an aperture 525A therethrough. Aperture 525A has a center axis 525A'. Design CRA $χ_p$ may correspond to the propagation angle of a chief ray transmitted by microlens 230 that passes through a specific position within aperture 525A, such as through center axis 525A'. Alternatively, design CRA $χ_p$ may be an angle formed by optical axis 231 and a line connecting point 232P and a point on center axis 525A'.

Alternatively, design CRA $χ_p$ may be defined with reference to edges of photodiodes 211 and 212. Photodiode 211 has a left edge 211L. Photodiode 212 has a right edge 212R. Design CRA $χ_p$ may be the propagation angle of a chief ray transmitted by microlens 230 that passes through a mid-point between edges 211L and 212R. Alternatively, design CRA $χ_p$ may be an angle formed by optical axis 231 and a line connecting point 232P and a mid-point between edges 211L and 212R.

Figure 1:
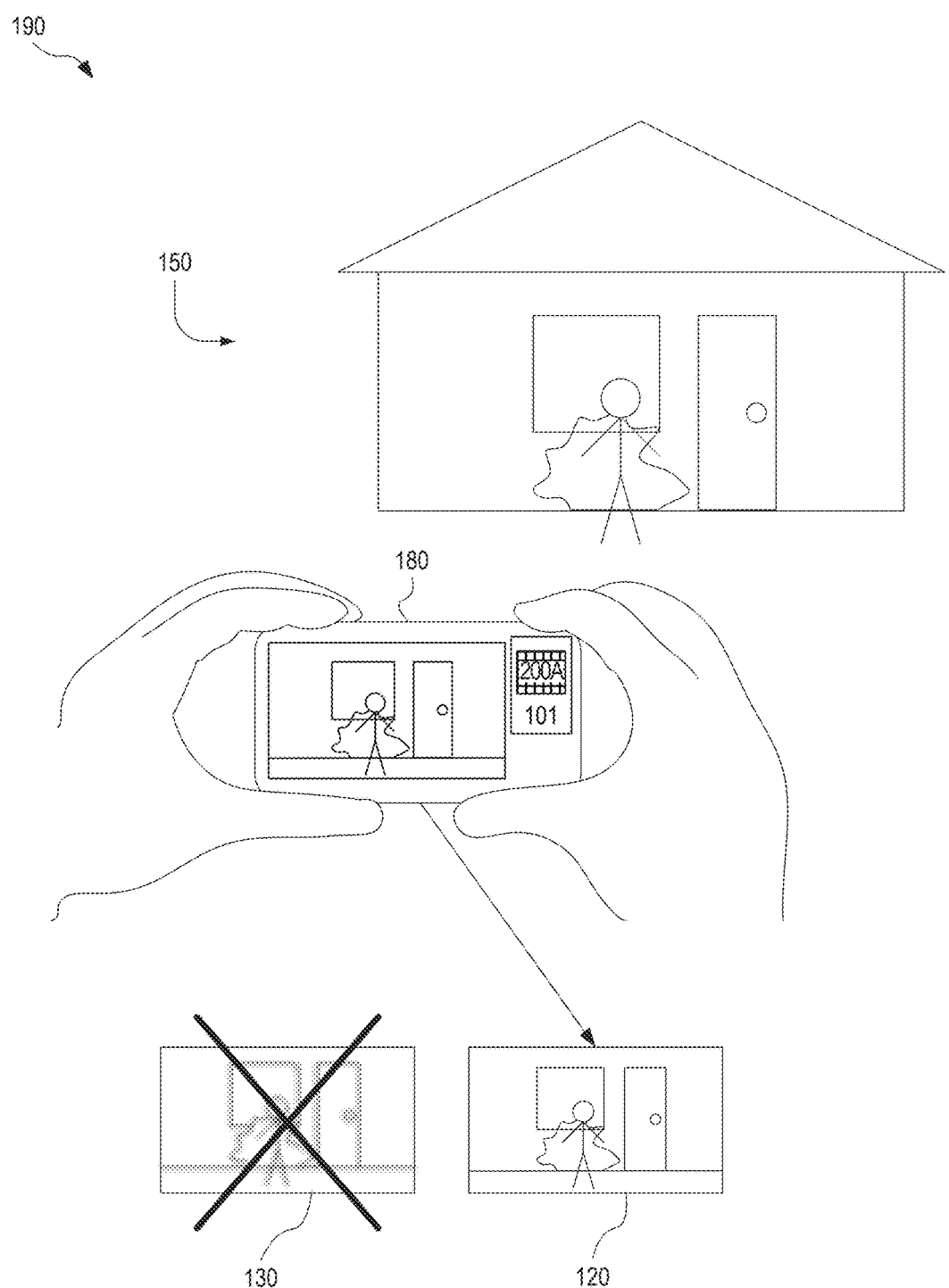
FIG. 1 illustrates a prior-art image sensor that includes a prior-art pixel array having PDAF pixels in a use scenario.
Figure 3A:
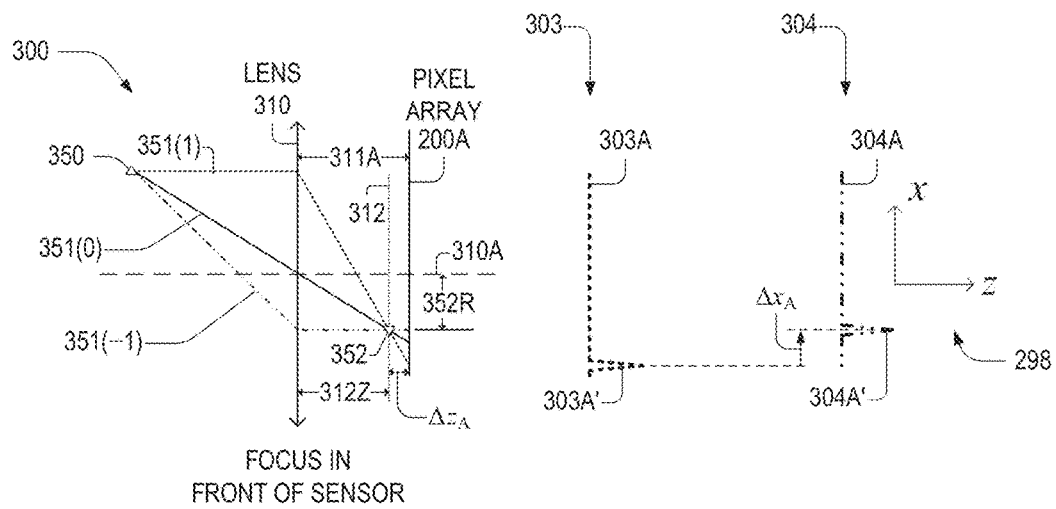
FIGS. 3A-3C are cross-sectional views of a PDAF imaging system in which the pixel array is at different positions with respect to the focal plane.
Figure 3B:
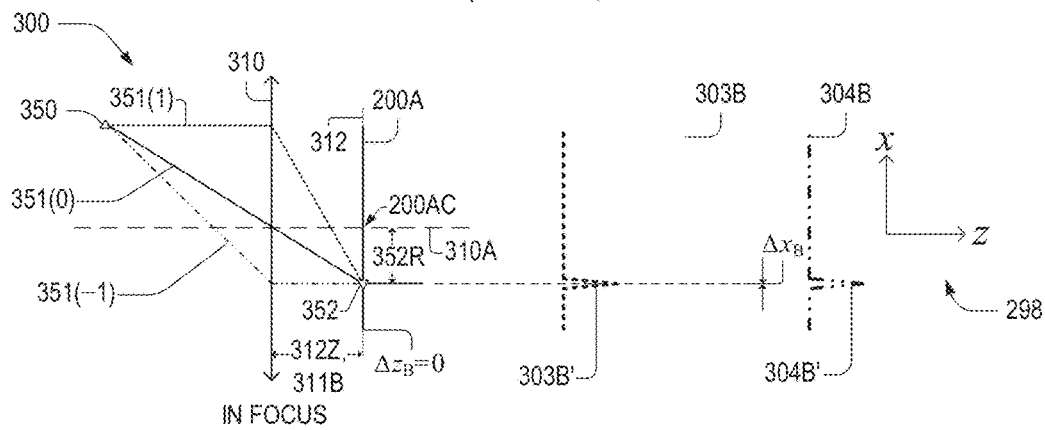
Figure 3C:
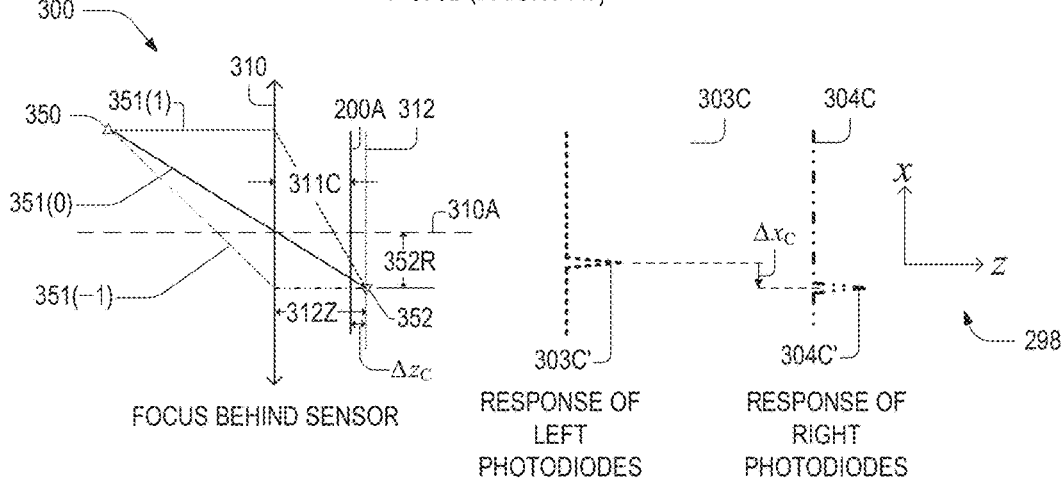

In Eq. (1), distance $d_{pa}$ is a characteristic distance between pixel array 200A and lens 310 along the z-axis of coordinate system 298. Herein, distances from lens 310 are referenced to a principal plane of lens 310, unless noted otherwise. Distances 311A—C of FIG. 3 are examples of distance $d_{pa}$. Distance $d_{pa}$ is for example within a range of image plane distances 312Z between focal plane 312 and lens 310 where image plane distances range from f to an integer multiple of f. Alternatively, $d_{pa}$=f.

In FIG. 5, pixel array 500A is at a focal plane of an imaging system, not shown, that transmits a chief-ray 551(0) and marginal rays 551(±1) thereto. Chief ray 551(0) propagates to a focus 531P and forms an angle $\chi_p$ with optical axis 231. Lens 230 refracts marginal rays 551(±1), also propagating at angle $\chi_p$, to a focus 531P where they intersect chief ray 551(0). As focus 531P is within photodiode 212 and rays 551 propagate a longer distance in photodiode 212 than they do in photodiode 211, photodiode 212 has a stronger response to rays 551 than does photodiode 211, which is illustrated in FIG. 6.

Figure 6:
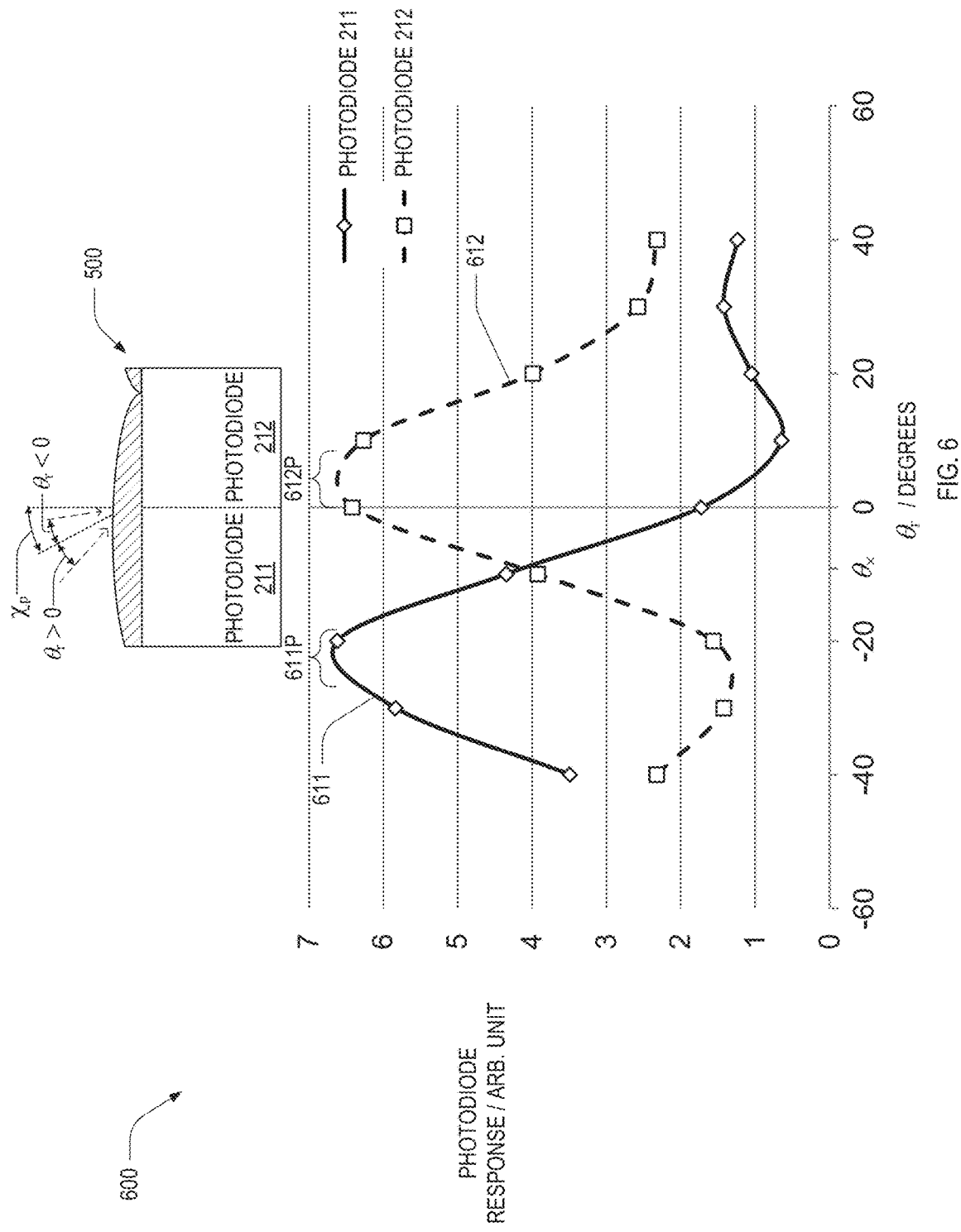
FIG. 6 is a schematic angular selectivity plot of the off-axis multi-diode PDAF pixel of FIG. 5.

FIG. 6 is a schematic angular selectivity plot 600 of off-axis multi-diode PDAF pixel 500 showing photodiode response as a function of relative CRA $\theta_r$, which is the chief-ray angle of incident light offset by design CRA $\chi_p$. Plot 600 includes photodiode response 611 of left photodiode 211 and photodiode response 612 of right photodiode 212. Photodiode responses 611 and 612 are equal when angle $\theta_r$ equals a "crossing angle" $\theta_x$, which in this example is $\theta_x \approx -9°$. Photodiode responses 611 and 612 have respective peak regions 611P and 612P that are symmetric about crossing angle $\theta_x$.

Applicant has determined that PDAF accuracy decreases as crossing angle $\theta_x$ deviates from zero degrees. For multi-diode PDAF pixels with photodiodes 211 and 212 having equal width, crossing angle $\theta_x$ increases with radial distance $r_p$ (e.g., distance 352R, FIG. 3) of the PDAF pixel from the imaging lens optical axis (e.g., optical axis 310A).

Figure 7:
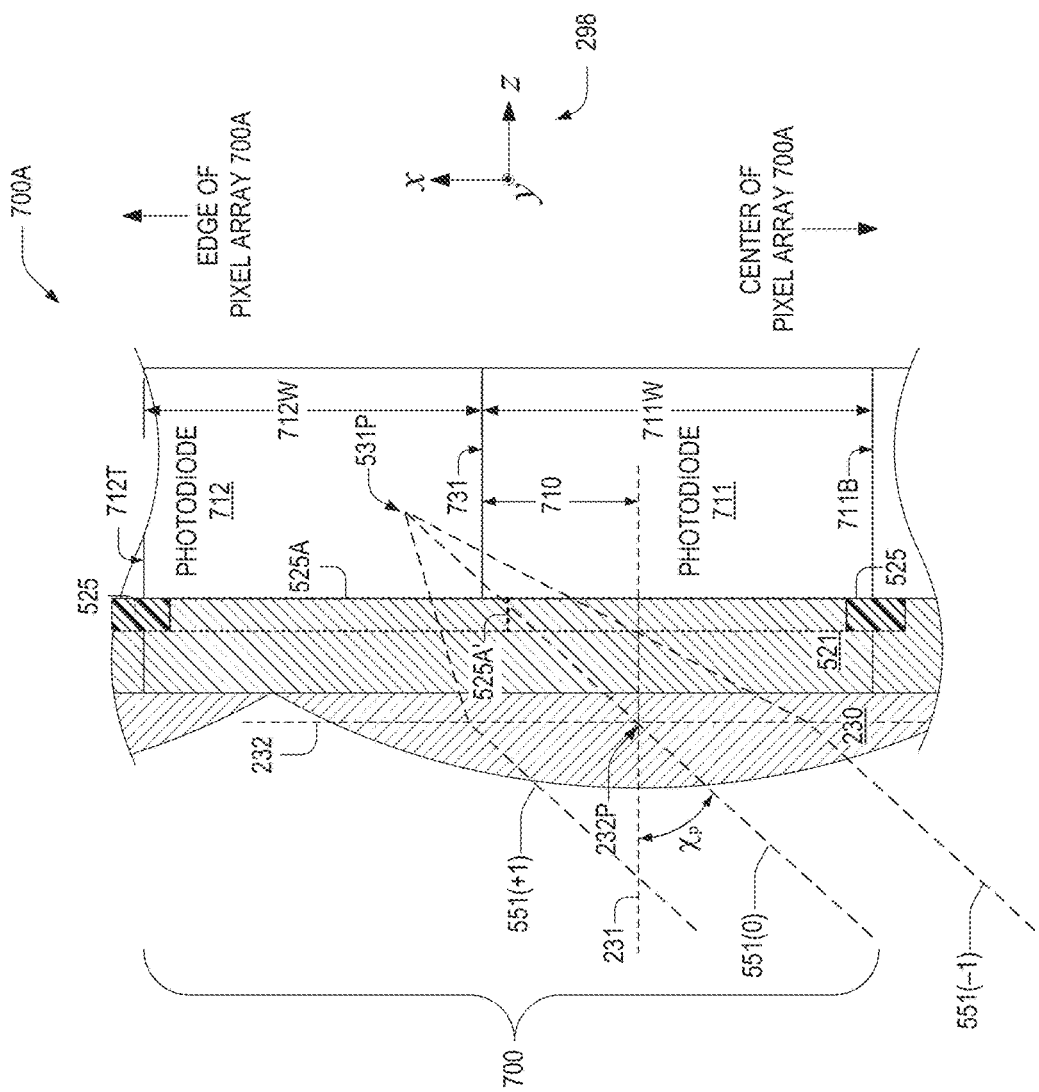
FIG. 7 is a cross-sectional view of an off-axis multi-diode PDAF pixel of a PDAF pixel array, in an embodiment.

FIG. 7 is a cross-sectional view of an off-axis multi-diode PDAF pixel 700 included in a PDAF pixel array 700A. PDAF pixel array 700A is for example part of a CMOS image sensor, and is compatible for use in image sensor 101 as a replacement for pixel array 200A. In FIG. 7, pixel array 700A is depicted at a focal plane of an imaging system, not shown, that transmits a chief-ray 551(0) and marginal rays 551(±1) thereto.

Pixel 700 has photodiodes 711 and 712 that are further and closer respectively to a geometric center of PDAF pixel array 700A. Photodiodes 711 and 712 have respective widths 711W and 712W where width 711W exceeds 712W. Interface 731 between photodiodes 711 and 712 is at a distance 710 from optical axis 231. Distance 710 exceeds distance 510 of PDAF pixel 500, FIG. 5. Photodiodes 711 and 712 are shown having common color filter 521 thereon. Photodiodes 711 and 712 may have different respective color filters thereon without departing from the scope hereof.

Figure 8:
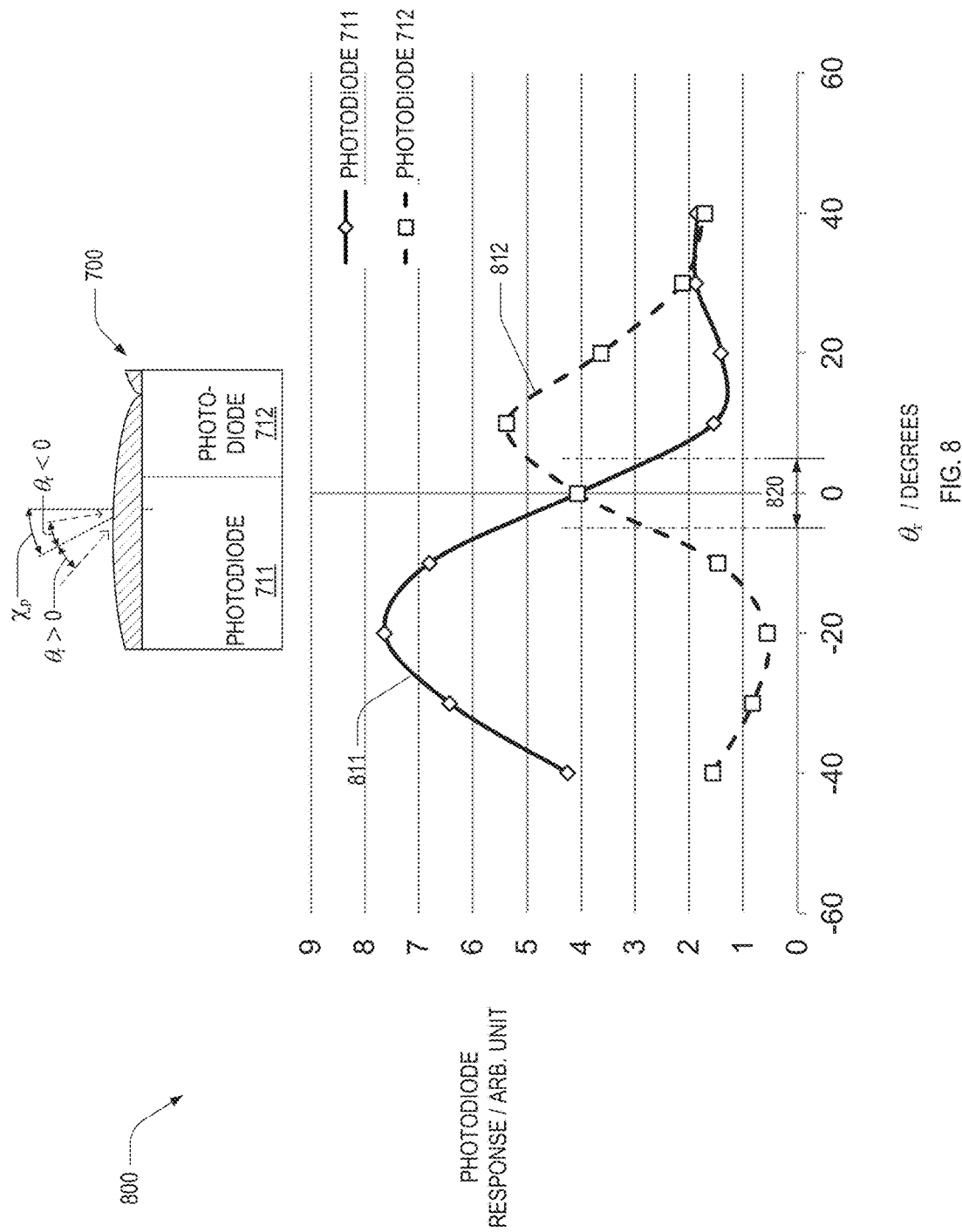
FIG. 8 is a schematic angular selectivity plot of the off-axis multi-diode PDAF pixel of FIG. 7.

Pixel 700A may include opaque structure 525 and corresponding aperture 525A. Photodiode 711 has a bottom edge 711B. Photodiode 712 has a top edge 712T. Design CRA $\chi_p$ may be defined in with respect to aperture 525A or edges 711B and 712A in analogous ways to those discussed with respect to pixel 500A. FIG. 8 is a schematic angular selectivity plot 800 of off-axis multi-diode PDAF pixel 700 showing photodiode response as a function of relative CRA $\theta_r$. Plot 800 includes photodiode response 812 of right photodiode 712 and photodiode response 811 of left photodiode 711. Photodiode responses 811 and 812 are equal at a value of $\theta_r$ within an angular range 820 that includes $\theta_r$=0. As photodiode responses 811 and 812 are respective attributes of photodiodes 711 and 712 of PDAF pixel 700, crossing angle $\theta_x$ is an attribute of PDAF pixel 700. Angular range 820 is for example ±4° about $\theta_r$=0. Angular range 820 may be larger, for example, ±8° or ±18° about $\theta_r$=0.

Figure 9:
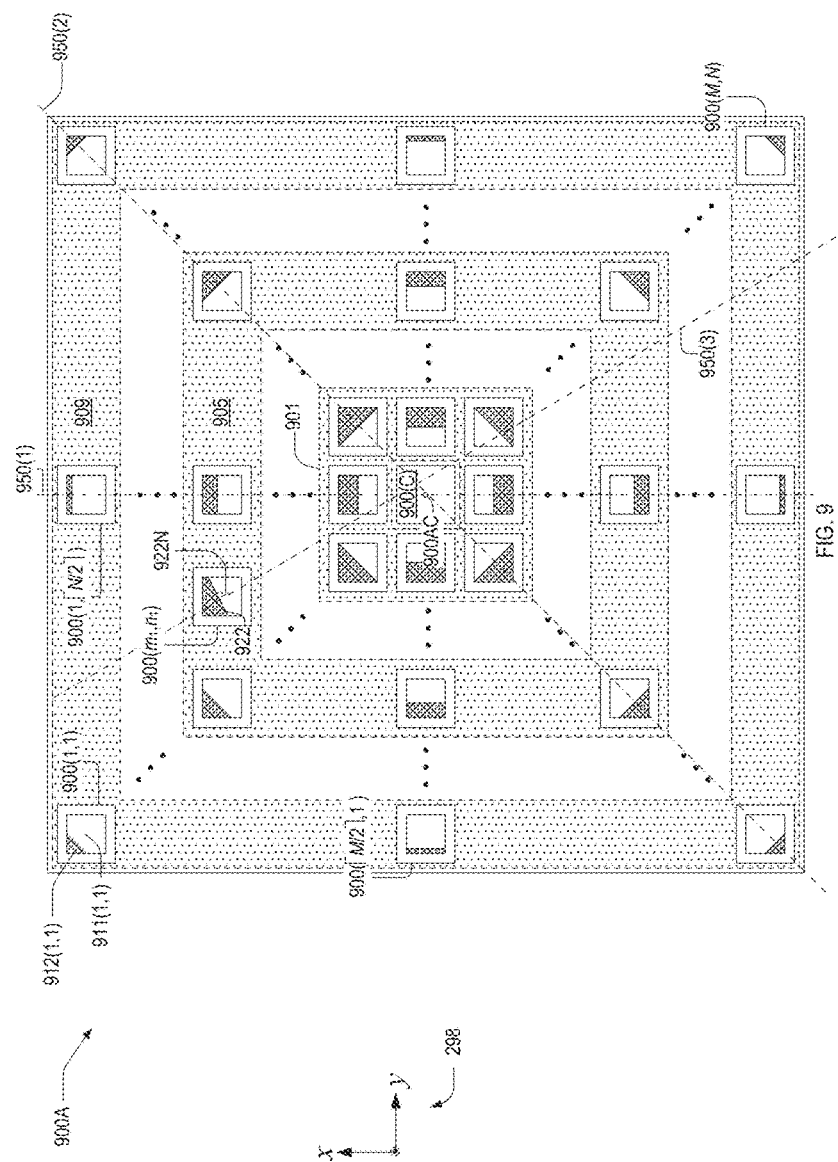
FIG. 9 is a plan view of a first PDAF pixel array that includes a plurality of off-axis multi-diode PDAF pixels of FIG. 7, in an embodiment.

In an embodiment, the ratio of width 711W to width 712W varies with distance $r_p$ of optical axis 231 to a geometric center of PDAF pixel array 700A, as illustrated in FIG. 9. FIG. 9 is a plan view of a PDAF pixel array 900A having a plurality of pixels 900(m,n), where 1<m<M and 1<n<N and m, n, M, and N are each positive integers. Each pixel 900 and pixel array 900A are examples of pixel 700 and PDAF pixel array 700A, respectively. Each pixel 900 and pixel array 900A are examples of pixel 700 and PDAF pixel array 700A, respectively, and are compatible for use in image sensor 101.

Pixel-array center 900AC is analogous to pixel-array center 200AC, such that when pixel array 900A is part of an imaging system including a lens, the lens optical axis is aligned with pixel-array center 900AC to within tolerances attainable in the art.

In the embodiment of FIG. 9, pixel array 900A includes a center pixel $$900\left(\left\lceil\frac{M}{2}\right\rceil,\left\lceil\frac{N}{2}\right\rceil\right)$$

(hereinafter "900(C)") at pixel-array center 900AC. Pixel array 900A includes center pixel 900(C) when, for example, the total number of pixel rows and the total number of pixel columns of pixel array 900A are each odd. In a different embodiment, pixel array 900A does not include a center pixel, such that pixel-array center 900AC is between adjacent pixels 900, for example, when the total number of pixel rows and the total number of pixel columns of pixel array 900A are each even.

As illustrated in FIG. 9, both M and N are odd, though at least one of M and N may be even without departing from the scope hereof. FIG. 9 illustrates selected pixels 900 in three regions 901, 905, and 909. Each pixel 900 has a respective photodiode pair: an inner photodiode 911 and an outer photodiode 912, where for a given pixel 900, at least part of inner photodiode 911 is between outer photodiode 912 and pixel-array center 900AC. For example, pixel 900(1,1) includes photodiodes 911(1,1) and 912(1,1). In FIG. 9, inner photodiodes are white and outer photodiodes are hatched.

Pixel 900(C) is centered on the origin (x,y)=(0,0) of coordinate system 298. For any pixel 900(m, n) centered at coordinates $(x_m,y_n)$, the area ratio R of its inner photodiode 911(m, n) to its outer photodiode 912(m, n) is a function of $(x_m,y_n)$ such that ratio $R(x_m,y_n)$ increases according to the distance between pixel 900(m,n) and pixel-array center 900AC. In FIG. 9 for example, ratio R in region 909 exceeds ratio R in region 905, which exceeds ratio R in region 901. For example, ratio $R(x_m,y_n)$ is a polynomial in at least one of $x_m$ and $y_n$: $R(x_m,y_n)=\Sigma_k a_k |x_m|^k + b_k |y_n|^k + c_0$, hereinafter referred to as Equation (2). In Eq. (2), k is a non-negative integer and $R(0,0)=c_0$, where for example $c_0=1$ and $(x_m,y_n)$ are related to $r_p$ as $r_p^2 = r_{m,n}^2 = x_m^2 + y_n^2$. Alternatively, $R(x_m,y_n)$ may be expressed as a function of design CRA $\chi_p$ (m, n). For example, $R(x_m,y_n)$ increases linearly as a function of design CRA $\chi_p$ (m, n).

Pixels along an image sensor diagonal, such as pixel 900(1,1), are shown to have photodiodes 901 that are triangular. Such diagonal pixels may have photodiodes 901 that are rectangular, for example, similar to those of pixel $$900\left(1, \left\lceil \frac{N}{2} \right\rceil\right)$$

or pixel $$900\left(\left\lceil \frac{M}{2} \right\rceil, 1\right).$$

For a given pixel 900, the interface between its inner and outer photodiodes may be at an angle with respect to a line between the center of the pixel and pixel-array center 900AC. For example, pixel 900($m_1$, $n_1$) has an interface 922 that is orthogonal to a line 922N in the direction of pixel-array center 900AC such that its photodiodes are trapezoidal.

FIG. 9 illustrates pixel array 900A with every pixel thereof being a PDAF pixel 700, PDAF pixel 900 in this instance. In an embodiment, pixel array 900A includes pixels that differ from PDAF pixel 700, such pixels with single photodiodes, or dual-photodiode pixels with equal-sized photodiodes. FIG. 9 includes lines 950 superimposed on pixel array 900A that intersect the region occupied by center pixel 900(C), for example, at pixel-array center 900AC. Lines 950(1-3) are shown as examples and are not meant to limit orientation of a line 950 through the region occupied by center pixel 900(C). In an embodiment, pixel array 900A includes at least one of (a) a plurality of PDAF pixels 700 located beneath line 950(1), (b) a plurality of PDAF pixels 700 located beneath line 950(2), and (c) a plurality of PDAF pixels 700 located beneath line 950(3).

In an embodiment, a pixel 900 in region 909, a pixel 900 in region 905, and a pixel in region 901 are collinear. Pixels in region 901 are closer to pixel-array center 900AC than a percentage of the total number of pixels constituting pixel array 900A. This percentage for example exceeds ninety-five percent, or alternatively is between ninety percent and ninety-five percent.

Figure 10:
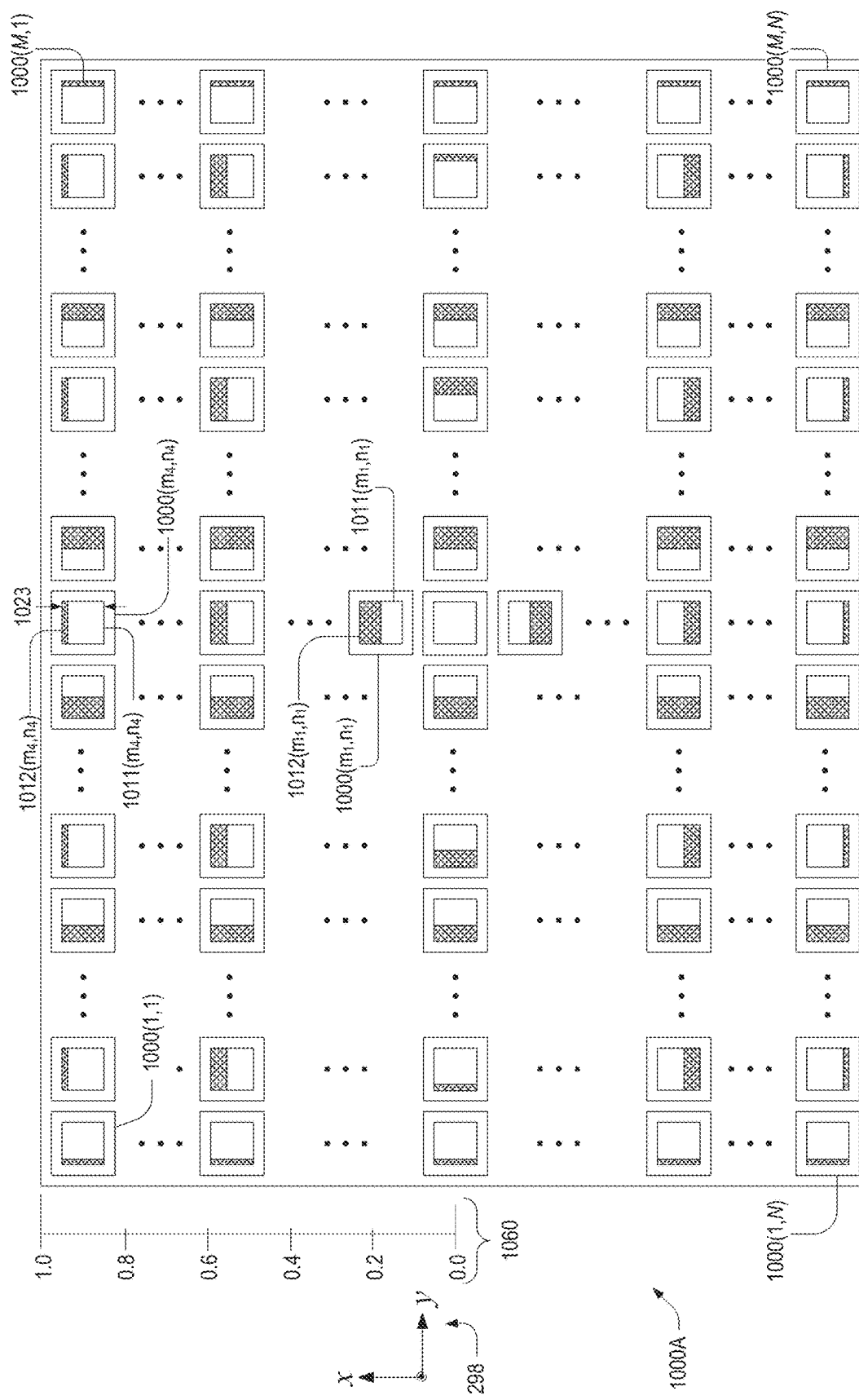
FIG. 10 is a plan view of a second PDAF pixel array that includes a plurality of off-axis multi-diode PDAF pixels of FIG. 7, in an embodiment.

FIG. 10 is a plan view of a PDAF pixel array 1000A having a plurality of PDAF pixels 1000($m,n$), where, as in FIG. 9, 1<m<M and 1<n<N and m, n, M, and N are each positive integers. PDAF pixels 1000 and PDAF pixel array 1000A are examples of PDAF pixel 700 and PDAF pixel array 700A, respectively. PDAF pixel array 1000A is similar to PDAF pixel array 900A, except that for each pixel 1000, the division between photodiodes is either along the x direction or y direction denoted by coordinate system 298.

Figure 11:
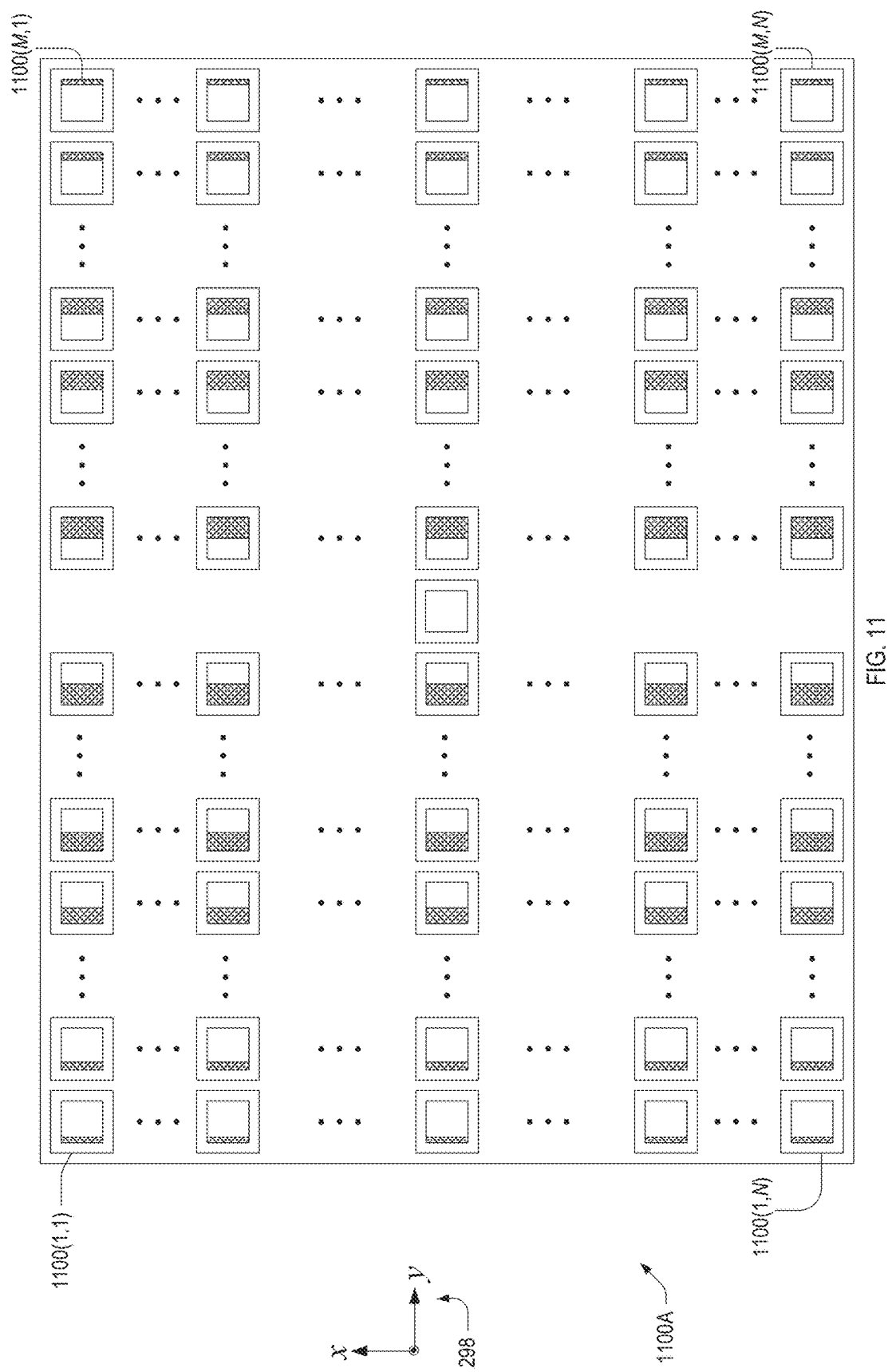
FIG. 11 is a plan view of a third PDAF pixel array that includes a plurality of off-axis multi-diode PDAF pixels of FIG. 7, in an embodiment.

FIG. 11 is a plan view of a PDAF pixel array 1100A having a plurality of PDAF pixels 1100($m,n$), where, as in FIG. 10, 1<m<M and 1<n<Nand m, n, M, and N are each positive integers. PDAF pixels 1100 and PDAF pixel array 1100A are examples of PDAF pixel 700 and PDAF pixel array 700A, respectively. PDAF pixel array 1100A is similar to PDAF pixel array 1000A, except that for each pixel 1100, the division between photodiodes is along the x direction denoted by coordinate system 298.

Each PDAF pixel 700, 900, 1000, and 1100 are shown as having two photodiodes. A PDAF pixel, such as PDAF pixels 700, 900, 1000, and 1100, may have more than two photodiodes without departing from the scope hereof.

When a pixel array is a the focal plane of an imaging system, the incident angle of a chief ray incident on the pixel array at distance $r_p$ from the pixel array center, that is, CRA $\chi_p$, depends on distance $r_p$. In FIG. 10 illustrates normalized distances 1060, that is, $r_p$ normalized to the half-width of pixel array 1000A in the x direction of coordinate system 298.

Figure 12:
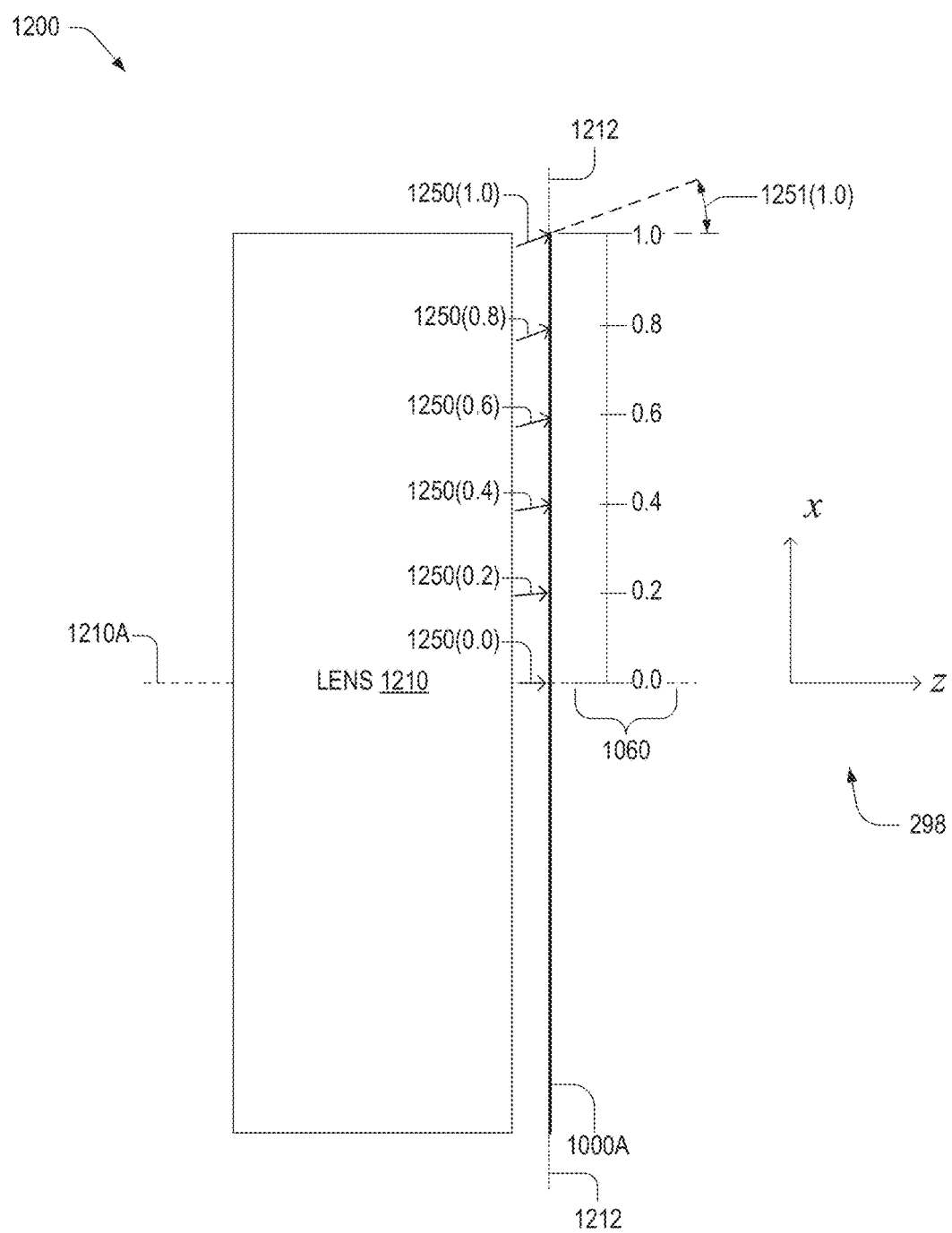
FIG. 12 is a cross-sectional view of the FIG. 10 PDAF pixel array at an image plane of an imaging system, in an embodiment.

FIG. 12 is a cross-sectional view of an imaging system 1200 that includes PDAF pixel array 1000A aligned with optical axis 1200A of a lens 1210. Pixel array 1000A is at image plane 1212 plane of imaging system 1200. Inclusion of PDAF pixel array 1000A instead of other examples of PDAF pixel array 700A is for illustrative purposes only. Other examples of PDAF pixel array 700A may replace PDAF pixel array 1000A in FIG. 12. Lens 1210 is for example a compound lens that includes a thick lens and a surface designed to reduce chief-ray angles near pixel-array edges.

FIG. 12 illustrates a plurality of chief-rays 1250($x$) imaged onto PDAF pixel array 1000A by lens 1210. Each chief ray 1250($x$) is incident on pixel array 1000A at a respective distance x from optical axis 1200A, indicated by normalized distances 1060 and at a respective angle 1251($x$) with respect to optical axis 1210A. For example, chief ray 1250(0.0) propagates parallel to optical axis 1210A, such that angle 1251(0.0) is zero degrees, and chief ray 1250(1.0) propagates at angle 1251(1.0)

Figure 13:
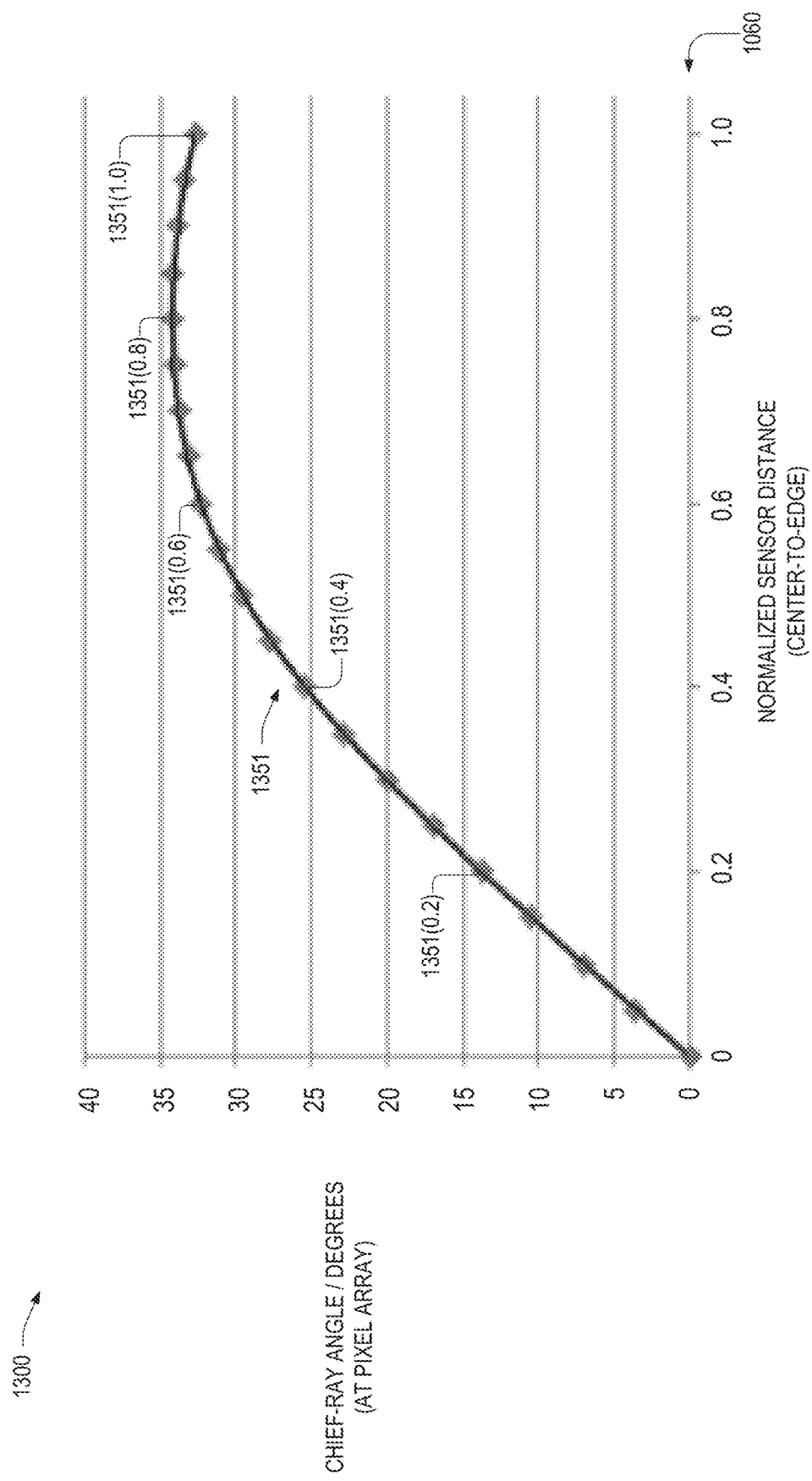
FIG. 13 is a plot of exemplary chief-ray angles as a function of normalized position on the image plane of FIG. 12.

FIG. 13 is a plot 1300 of chief-ray angles 1351 as a function of normalized distances 1060 on image plane 1212. Chief-ray angles 1351 are examples of chief-ray angles 1251 of chief rays 1250. In particular, chief-ray angles 1351(0.2, 0.4, 0.6, 0.8, 1.0) represent chief-ray angles of chief rays 1250(0.2, 0.4, 0.6, 0.8, 1.0), respectively. Plot 1300 may be generated by optical design software used in the art, and provides a mapping between image sensor position and chief-ray angle incident thereon.

Figure 14:
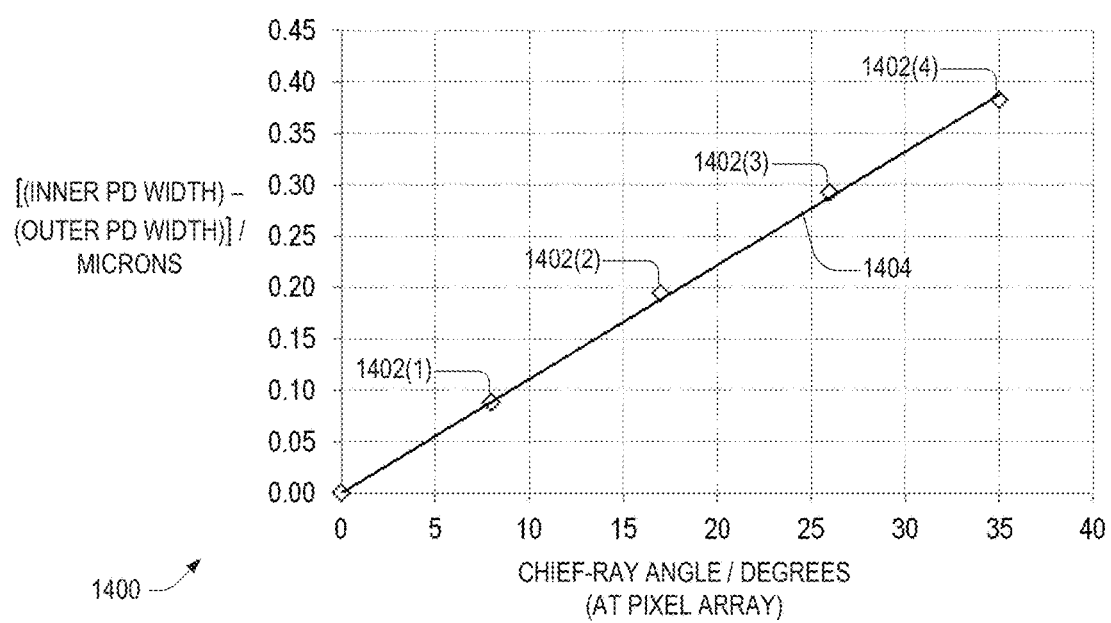
FIG. 14 shows an exemplary plot of optimal differences of inner and outer photodiode widths, vs. chief-ray angle, of PDAF pixels of the FIG. 7 PDAF pixel array, in an embodiment.
Figure 15:
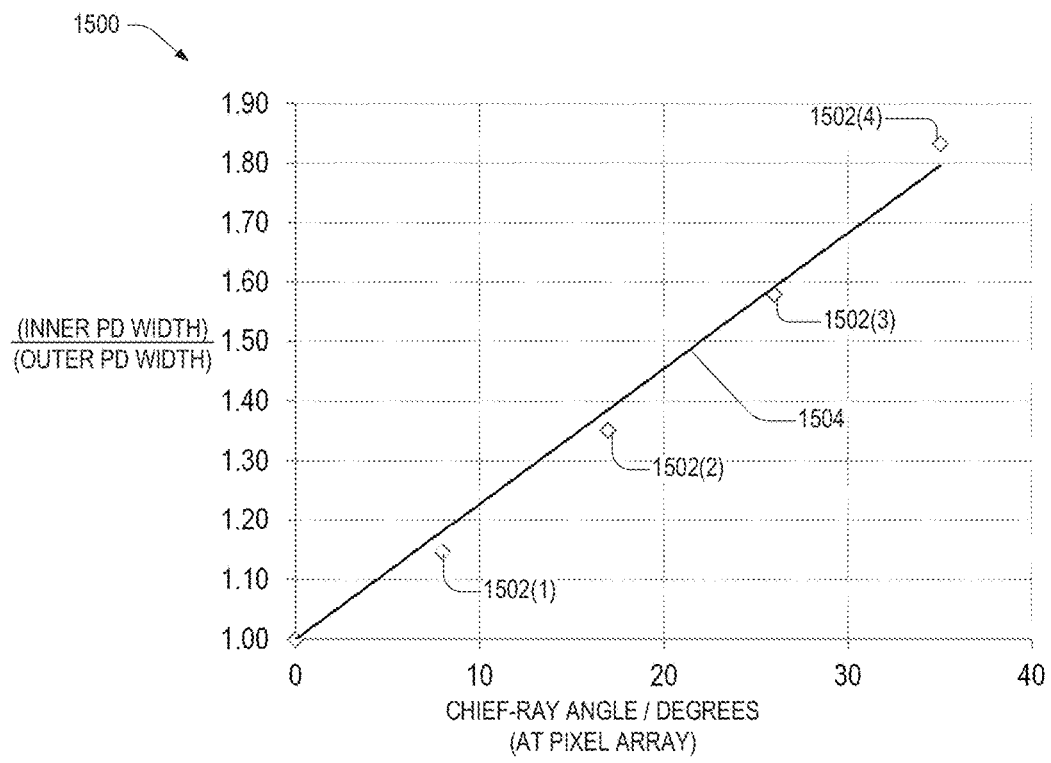
FIG. 15 shows an exemplary plot of optimal ratios of inner and outer photodiode widths of a PDAF pixel, vs. chief-ray angle, of the FIG. 7 PDAF pixel array, in an embodiment.

FIG. 14 shows an exemplary plot 1400 of optimal photodiode width differences 1402(1-4) as a function of chief-ray angle for an embodiment of PDAF pixel array 700A. FIG. 15 shows a plot 1500 of the same data as FIG. 14, but with optimum photodiode sizes expressed as photodiode width ratios 1502(1-4). Photodiode width differences 1402 and photodiode width ratios 1502 result from a finite-difference time-domain simulations of pixel optical response.

Photodiode widths refer to, for example, photodiode width 711W of inner photodiode 711 and photodiode width 712W of outer photodiode 712. When inner photodiode 711 and outer photodiode 712 have equal height along the y-axis of coordinate system 298, each photodiode width ratio 1502 also represents an area ratio of inner photodiode 711 to outer photodiode 712 in a same PDAF pixel 700. Optimum width differences and optimum width ratios correspond to when photodiode responses 811 and 812 are equal at a value of $\theta_r$ within angular range 820, as shown in FIG. 8.

Width difference 1402(1) and width ratio 1502(1) for example correspond to pixel 1000($m_1$, $n_1$) (FIG. 10) having inner photodiode 1011($m_1$, $n_1$) and outer photodiode 1012 ($m_1$, $n_1$). Width difference 1402(4) and width ratio 1502(4) for example correspond to pixel 1000($m_4$, $n_4$) having inner photodiode 1011($m_4$, $n_4$) and outer photodiode 1012($m_4$, $n_4$). Pixels 1000 each of a have a total photodiode height 1023, as illustrated for pixel 1000($m_4$, $n_4$). In the simulations that generated width differences 1402 and width ratios 1502, height 1023 equals 1.3 µm.

Width differences 1402 are fit by a line 1404 with slope $m_{12}$=0.0111 µm/degree and a coefficient of determination $R^2$=0.9991. Width ratios 1502 are fit by a line 1504 having a slope $m_{13}$=0.0228/degree and a coefficient of determination $R^2$=0.9908. Lines 1404 and 1504 intersect the origin of plots 1400 and 1500, respectively, which correspond to a chief-ray angle equal to zero and, in a PDAF pixel 700, photodiode width 711 being equal to photodiode with 712.

Figure 16:
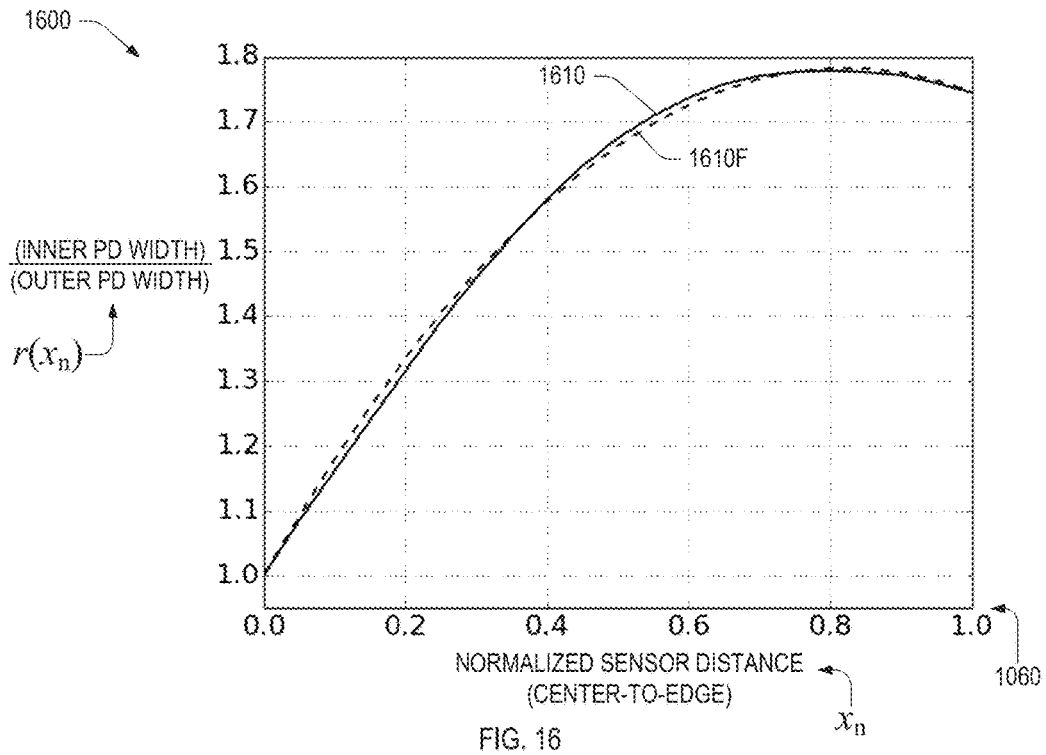
FIG. 16 shows a plot of exemplary photodiode width ratios as a as a function of normalized distance from the center of the PDAF pixel array if FIG. 7, in an embodiment.

FIG. 16 shows a plot 1600 of exemplary photodiode width ratios 1610 (solid curve, $r(x_n)$) as a as a function of normalized distance 1060 ($x_n$) from the center of a PDAF pixel array 700A. Ratios 1610 correspond to ratios of line 1504 of plot 1500 plotted against normalized distances 1060 instead of chief-ray angle. Normalized distances 1060 are obtained from chief-ray angles of plot 1500 from plot 1300 of FIG. 13.

Plot 1600 also includes a parabolic fit 1610F to photodiode width ratios 1610. Parabolic fit 1610F satisfies $r(x_n)= ax_n^2+bx_n+1.0$, where fit values of a and b are a=−1.16, b=1.91. The root-mean-square error between width ratios 1610 and parabolic fit 1610F is $\Delta_{RMS}$=1.011×10$^{-2}$.

Combinations of Features

Features described above as well as those claimed below may be combined in various ways without departing from the scope hereof. The following examples illustrate some possible, non-limiting combinations:

(A1) A PDAF pixel array includes a first pixel and a second pixel. The first pixel is located at a first distance from a center of the PDAF pixel array and includes a first inner photodiode and a first outer photodiode with respect to the center. The first inner photodiode and the first outer photodiode occupy respectively a first inner area and a first outer area. The first inner area divided by the first outer area equals a first ratio. The second pixel is located at a second distance from the center and includes a second inner photodiode and a second outer photodiode with respect to the center. The second inner photodiode and the second outer photodiode occupy respectively a second inner area and a second outer area. The second inner area divided by the second outer area equals a second ratio. The second distance exceeds the first distance and the second ratio exceeds the first ratio.

(A2) In the PDAF pixel array denoted by (A1), a response of the first inner photodiode and the first outer photodiode may be equal in response to light incident within five degrees of a design chief-ray angle associated with the first pixel.

(A3) A PDAF pixel array denoted by one of (A1) and (A2) may further include a third pixel located at a third distance from the center and includes a third inner photodiode and a third outer photodiode with respect to the center. The third inner photodiode and the third outer photodiode occupy respectively a third inner area and a third outer area. The third inner area divided by the third outer area equals a third ratio. The third distance exceeds the second distance and the third ratio exceeds the second ratio.

(A4) In the PDAF pixel array denoted by (A3), the first pixel may at least one of (1) overlap the pixel-array center, (2) be closer to the pixel array center than all other pixels of the PDAF pixel array, and (3) be closer to the pixel-array center than ninety percent of all other pixels in the PDAF pixel array.

(A5) A PDAF pixel array denoted by one of (A3) and (A4) may further include a fourth pixel located at a fourth distance from the center. The fourth pixel includes a fourth inner photodiode and a fourth outer photodiode with respect to the center. The fourth inner photodiode and the fourth outer photodiode occupy respectively a fourth inner area and a fourth outer area. The fourth inner area divided by the fourth outer area equal a fourth ratio. The fourth distance exceeds the third distance and the fourth ratio exceeds the third ratio. The first, second, third, and fourth ratios are representable as a parabolic function of the respective first, second, third, and fourth distances.

(A6) In the PDAF pixel array denoted by (A5), the parabolic function may be a parabolic curve fit to at least four coordinates $\{(x_1,y_1), (x_2,y_2), (x_3,y_3), (x_4,y_4)\}$ and may have a root-mean-square error relative to the at least four coordinates less than 0.02, where $\{x_1,x_2,x_3,x_4\}$ correspond to the first, second, third, and fourth distances respectively and $\{y_1,y_2,y_3,y_4\}$ correspond to the first, second, third, and fourth ratios respectively.

(A7) A PDAF pixel array denoted by one of (A1) through (A6) may further include a third pixel located at a third distance from the center. The third pixel includes a third inner photodiode and a third outer photodiode with respect to the center. The third inner photodiode and the third outer photodiode occupy respectively a third inner area and a third outer area. The third inner area divided by the third outer area equals a third ratio. The third distance may be less than the second distance, and the third ratio equals the first ratio. Alternatively, the third distance exceeds the second distance, and the third ratio equals the second ratio.

(B1) A PDAF imaging system includes an imaging lens and an image sensor aligned with the imaging lens. The image sensor has the PDAF pixel array denoted by (A1).

(B2) In the PDAF imaging system denoted by (B1), the first pixel (a) may be located on the PDAF pixel array associated with a first chief-ray angle transmitted by the imaging lens aligned with the PDAF pixel array. A response of the first inner photodiode and the first outer photodiode may be equal in response to light incident within five degrees of the first chief-ray angle.

(B3) In a PDAF imaging system denoted by one of (B1) and (B2), the PDAF pixel array may further include a third pixel located at a third distance from the center. The third pixel includes a third inner photodiode and a third outer photodiode. The third inner photodiode and the third outer photodiode occupy respectively a third inner area and a third outer area. The third inner area divided by the third outer area equals a third ratio. The third distance exceeds the second distance and the third ratio exceeds the second ratio.

(B4) In a PDAF imaging system denoted by (B3), the first pixel may be at least one of (1) overlap the pixel-array center, (2) be closer to the pixel array center than all other pixels of the PDAF pixel array, and (3) be closer to the pixel-array center than ninety percent of all other pixels in the PDAF pixel array.

(B5) In a PDAF imaging system denoted by one of (B3) and (B4), the first, second, and third ratios may be representable a linear function of respective first, second, and third distances.

(B6) In a PDAF imaging system denoted by (B5), the linear function may be a least-squares line of best fit to three coordinates $\{(x_1,y_1), (x_2,y_2), (x_3,y_3)\}$, and may have a coefficient of determination exceeding 0.98, where $\{x_1,x_2,x_3\}$ correspond to the first, second, and third distances respectively and $\{y_1,y_2,y_3\}$ correspond to the first, second, and third ratios respectively.

(B7) A PDAF pixel array denoted by one of (B1) through (B6) may further include a third pixel located at a third distance from the center. The third pixel includes a third inner photodiode and a third outer photodiode with respect to the center. The third inner photodiode and the third outer photodiode occupy respectively a third inner area and a third outer area. The third inner area divided by the third outer area equals a third ratio. The third distance may be less than the second distance, and the third ratio equals the first ratio. Alternatively, the third distance exceeds the second distance, and the third ratio equals the second ratio.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A phase-detection auto-focus (PDAF) pixel array comprising:
    a first pixel located at a first distance from a center of the PDAF pixel array and including a first inner photodiode and a first outer photodiode with respect to the center, the first inner photodiode and the first outer photodiode occupying respectively a first inner area and a first outer area, the first inner area divided by the first outer area equaling a first ratio; and
    a second pixel located at a second distance from the center and including a second inner photodiode and a second outer photodiode with respect to the center, the second inner photodiode and the second outer photodiode occupying respectively a second inner area and a second outer area, the second inner area divided by the second outer area equaling a second ratio;
    the second distance exceeding the first distance, and
    the second ratio exceeding the first ratio.

2. The PDAF pixel array of claim 1, a response of the first inner photodiode and the first outer photodiode being equal in response to light incident within five degrees of a design chief-ray angle associated with the first pixel.

3. The PDAF pixel array of claim 1, further comprising:
    a third pixel located at a third distance from the center and including a third inner photodiode and a third outer photodiode with respect to the center, the third inner photodiode and the third outer photodiode occupying respectively a third inner area and a third outer area, the third inner area divided by the third outer area equaling a third ratio, the third distance being less than the second distance, and the third ratio equaling the first ratio.

4. The PDAF pixel array of claim 1, further comprising:
    a third pixel located at a third distance from the center and including a third inner photodiode and a third outer photodiode with respect to the center, the third inner photodiode and the third outer photodiode occupying respectively a third inner area and a third outer area, the third inner area divided by the third outer area equaling a third ratio, the third distance exceeding the second distance, and the third ratio equaling the second ratio.

5. The PDAF pixel array of claim 1, further comprising:
    a third pixel located at a third distance from the center and including a third inner photodiode and a third outer photodiode with respect to the center, the third inner photodiode and the third outer photodiode occupying respectively a third inner area and a third outer area, the third inner area divided by the third outer area equaling a third ratio,
    the third distance exceeding the second distance and the third ratio exceeding the second ratio.

6. The PDAF pixel array of claim 5, the first pixel at least one of (1) overlaps the pixel-array center, (2) is closer to the pixel array center than all other pixels of the PDAF pixel array, and (3) is closer to the pixel-array center than ninety percent of all other pixels in the PDAF pixel array.

7. The PDAF pixel array of claim 5, further comprising:
    a fourth pixel located at a fourth distance from the center and including a fourth inner photodiode and a fourth outer photodiode with respect to the center, the fourth inner photodiode and the fourth outer photodiode occupying respectively a fourth inner area and a fourth outer area, the fourth inner area divided by the fourth outer area equaling a fourth ratio,
    the fourth distance exceeding the third distance and the fourth ratio exceeding the third ratio.
    the first, second, third, and fourth ratios being representable as a parabolic function of the respective first, second, third, and fourth distances.

8. The PDAF pixel array of claim 7, the parabolic function being a parabolic curve fit to at least four coordinates $\{(x_1,y_1), (x_2,y_2), (x_3,y_3), (x_4,y_4)\}$ and having a root-mean-square error relative to the at least four coordinates less than 0.02, where $\{x_1,x_2,x_3,x_4\}$ correspond to the first, second, third, and fourth distances respectively and $\{y_1,y_2,y_3,y_4\}$ correspond to the first, second, third, and fourth ratios respectively.

9. A phase-detection auto-focus (PDAF) imaging system comprising:
    an imaging lens; and
    an image sensor aligned with the imaging lens and having a PDAF pixel array that includes:
    (a) a first pixel located at a first distance from a center of the PDAF pixel array and including a first inner photodiode and a first outer photodiode with respect to the center, the first inner photodiode and the first outer photodiode occupying respectively a first inner area and a first outer area, the first inner area divided by the first outer area equaling a first ratio, and
    (b) a second pixel located at a second distance from the center and including a second inner photodiode and a second outer photodiode with respect to the center, the second inner photodiode and the second outer photodiode occupying respectively a second inner area and a second outer area, the second inner area divided by the second outer area equaling a second ratio;
    the second distance exceeding the first distance, and
    the second ratio exceeding the first ratio.

10. The PDAF imaging system of claim 9, the first pixel (a) being located on the PDAF pixel array associated with a first chief-ray angle transmitted by the imaging lens aligned with the PDAF pixel array, and (b) a response of the first inner photodiode and the first outer photodiode being equal in response to light incident within five degrees of the first chief-ray angle.

11. The PDAF imaging system of claim 9, the PDAF pixel array further comprising:
    a third pixel located at a third distance from the center and including a third inner photodiode and a third outer photodiode with respect to the center, the third inner photodiode and the third outer photodiode occupying respectively a third inner area and a third outer area, the third inner area divided by the third outer area equaling a third ratio, the third distance being less than the second distance, and the third ratio equaling the first ratio.

12. The PDAF imaging system of claim 9, the PDAF pixel array further comprising:
    a third pixel located at a third distance from the center and including a third inner photodiode and a third outer photodiode with respect to the center, the third inner photodiode and the third outer photodiode occupying respectively a third inner area and a third outer area, the third inner area divided by the third outer area equaling a third ratio, the third distance exceeding the second distance, and the third ratio equaling the second ratio.

13. The PDAF imaging system of claim 9, the PDAF pixel array further comprising:

a third pixel located at a third distance from the center and including a third inner photodiode and a third outer photodiode, the third inner photodiode and the third outer photodiode occupying respectively a third inner area and a third outer area, the third inner area divided by the third outer area equaling a third ratio, the third distance exceeding the second distance and the third ratio exceeding the second ratio.

14. The PDAF pixel array of claim 13, the first pixel at least one of (1) overlaps the pixel-array center, (2) is closer to the pixel array center than all other pixels of the PDAF pixel array, and (3) is closer to the pixel-array center than ninety percent of all other pixels in the PDAF pixel array.

15. The PDAF imaging system of claim 13, the first, second, and third ratios being representable a linear function of respective first, second, and third distances.

16. The PDAF imaging system of claim 15, the linear function being a least-squares line of best fit to three coordinates $\{(x_1,y_1), (x_2,y_2), (x_3,y_3)\}$, and having a coefficient of determination exceeding 0.98, where $\{x_1,x_2,x_3\}$ correspond to the first, second, and third distances respectively and $\{y_1,y_2,y_3\}$ correspond to the first, second, and third ratios respectively.

* * * * *